United States Patent [19]

Kupcak et al.

[11] 4,226,550
[45] Oct. 7, 1980

[54] REINFORCED PLASTIC YOKE

[75] Inventors: Kenneth S. Kupcak; Rudolph F. Piecuch, both of Seven Hills, Ohio

[73] Assignee: Edward W. Daniel Company, Cleveland, Ohio

[21] Appl. No.: 943,002

[22] Filed: Sep. 18, 1978

[51] Int. Cl.³ .............................................. F16C 11/00
[52] U.S. Cl. .................... 403/157; 403/267; 264/274; 29/175 A
[58] Field of Search ............... 403/157, 158, 159, 79, 403/404, 265, 266, 267; 29/175 A; 74/DIG. 10, 501 P; 264/274, 271

[56] References Cited

U.S. PATENT DOCUMENTS

| | | | |
|---|---|---|---|
| 3,101,205 | 8/1963 | Benham | 74/DIG. 10 |
| 3,394,212 | 7/1968 | Maloney | 29/175 A X |
| 3,711,134 | 1/1973 | Goldberg | 403/159 |
| 3,796,297 | 3/1974 | Holbrook | 16/2 X |
| 4,051,591 | 10/1977 | Thompson | 264/274 X |

*Primary Examiner*—Andrew V. Kundrat
*Attorney, Agent, or Firm*—Maky, Renner, Otto & Boisselle

[57] ABSTRACT

Reinforced plastic yoke includes a collar portion and longitudinally extending leg portions, with a metal strip reinforcing insert having a pair of longitudinally extending legs and a web embedded respectively in the legs and collar of the yoke. The legs of the metal reinforcing strip at their distal ends each include openings concentric with clevis pin openings in the legs of the yoke and the web includes an opening which accommodates a longitudinally extending bore in the collar portion. Additionally, an internally threaded metal insert fitting may be provided in the yoke collar portion extending axially through the web opening in the metal strip reinforcing insert, with mechanical locks to prevent relative movement between the fitting, collar portion, and metal insert.

23 Claims, 7 Drawing Figures

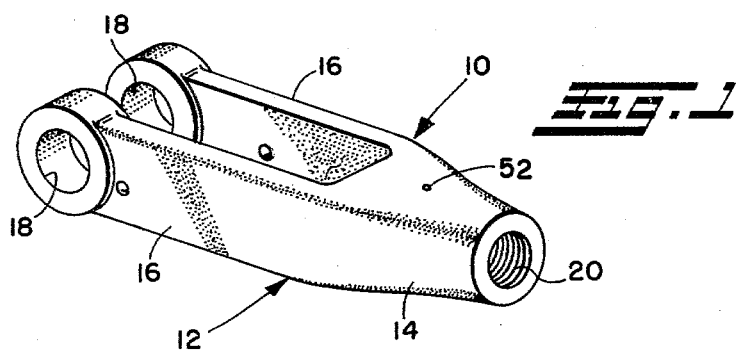
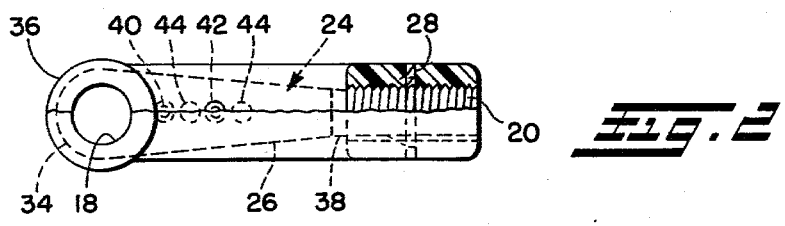
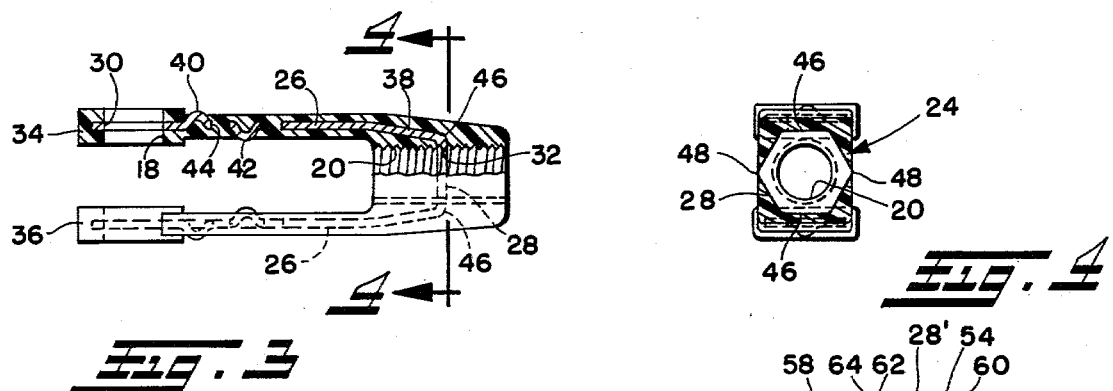
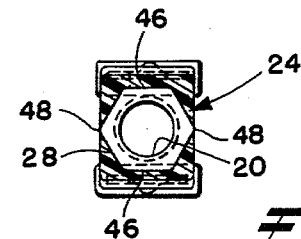
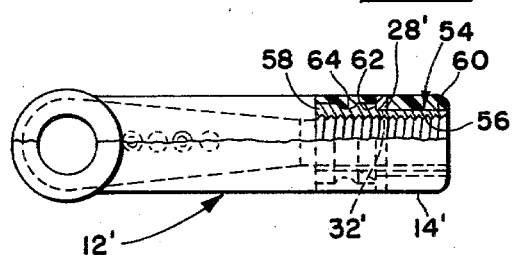
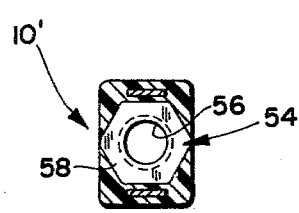
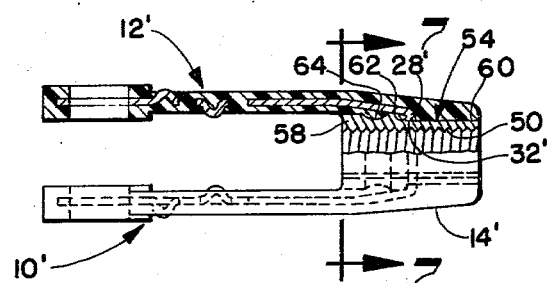

REINFORCED PLASTIC YOKE

BACKGROUND OF THE INVENTION

The present invention relates generally as indicated to a reinforced plastic yoke, and more particularly, to adjustable yoke ends which may be used in coupling assemblies wherever length and/or tension adjustments are needed, e.g., in clutch controls, throttle controls, guy wire assemblies, linkage assemblies generally, tie down assemblies, etc.

Heretofore, it has been the usual practice to make yokes, and particularly adjustable yoke ends, of steel or other metals and coined, forged or wrought to desired shape. Subsequent machining of the formed metal blanks provides the longitudinally extending threaded bore in the collar thereof and transversely aligned clevis pin receiving bores in the distal ends of the legs thereof.

Such forging process and subsequent machining of the yoke ends is time consuming and expensive thereby making the yoke ends relatively expensive to manufacture. In addition, substantial amounts of metal are required to form the yoke ends further adding to the cost of manufacture. The yoke ends are also relatively heavy, and in some applications the added weight is an important consideration, for example, in the design of control linkages such as for use in the aerospace industry. Moreover, such yoke ends are subject to corrosion and rust leading to loss of adjustability and/or premature failure of the yoke ends when deterioration has substantially progressed unless the yoke ends are made of expensive corrosion resistant materials which further add to the cost of the yoke ends. Another problem is that the subsequent machining of the clevis pin receiving bores may lead to slight tolerance errors which may affect the usage of the yoke ends especially where close tolerances and precision are required.

SUMMARY OF THE INVENTION

With the foregoing in mind, it is a principal object of this invention to provide an adjustable yoke end which is less costly to manufacture than presently known yoke ends.

Another object is to provide such a yoke end which has a greater strength-to-weight ratio than previously attainable in conventional yokes.

Still another object is to provide such a yoke end which is resistant to rust and corrosion and other types of corrosive environments, and able to repeat close tolerances part after part.

These and other objects of the present invention may be achieved by making the yoke out of a lightweight plastic, suitably reinforced to obtain the desired strength. The yoke includes a plastic body having a collar and spaced-apart longitudinally extending legs each of which are provided at their distal ends with transversely aligned clevis pin receiving bores. The plastic body has embedded therein a metal strip reinforcing insert having spaced-apart longitudinally extending legs and a web embedded respectively in the legs and collar of the plastic body. The distal ends of the legs are provided with openings therein which are concentric with the clevis pin receiving bores to allow for passage of a clevis pin therethrough. The web includes an opening which accommodates a longitudinally extending threaded bore in the collar.

Mechanical locks are provided to prevent relative movement between and to lock together the metal insert and plastic body thus to form cooperatively acting strength members. More particularly, plural oppositely extending embossments and openings may be provided in each leg of the insert, and the web of the insert may be of hexagonal or other irregular shape further to prevent rotation thereof with the collar.

According to another embodiment of the invention, an internally threaded insert fitting is embedded in the collar portion of the plastic body and extending longitudinally through the opening in the web of the metal strip reinforcing insert. The insert fitting may likewise include mechanical locks for preventing movement longitudinally in one direction and rotation relative to the collar portion of the plastic body. The insert fitting, metal strip reinforcing insert, and plastic body cooperate to provide the relatively low cost, high strength, low weight yoke of the present invention.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWING

FIG. 1 is a perspective view of a preferred form of plastic reinforced yoke in accordance with the present invention;

FIG. 2 is a side elevation view of the yoke of FIG. 1, with a portion of the yoke collar being shown in section;

FIG. 3 is a top plan view of the yoke of FIG. 1, having a portion of the yoke collar and one of the yoke legs in section;

FIG. 4 is a transverse section through the yoke, taken along the plane of the line 4—4 of FIG. 3;

FIG. 5 is a side elevation view similar to FIG. 2 but of a modified form of the yoke of the present invention;

FIG. 6 is a top plan view of the yoke of FIG. 5, with a portion of the yoke collar and one of the yoke legs shown in section; and FIG. 7 is a transverse section through the yoke of FIG. 6, taken along the line 7—7 thereof.

DESCRIPTION OF THE PREFERRED EMBODIMENTS

Referring now in greater detail to the drawings, and initially to FIG. 1, a preferred form of reinforced plastic yoke in accordance with the present invention is generally indicated by the reference numeral 10. As shown, the yoke 10 comprises a plastic body 12 which may be similar in shape to known conventional yokes, including a slightly tapered collar portion 14 and a pair of substantially flat and parallel longitudinally extending, spaced apart leg portions 16 having at their distal ends transversely aligned bores 18 adapted to receive a clevis pin or the like therethrough in customary manner. The collar portion 14 includes a longitudinally extending internally threaded bore 20, the threads of which are adapted to interfit with the threaded end of an adjustment rod (not shown) as is customary to facilitate longitudinal adjustment of the length of the rod and yoke by relative rotation therebetween as required.

The bore 20 in the collar portion 14 preferably extends entirely the length thereof for maximum adjustability, but may extend only partially therethrough if desired. If the yoke is used solely as a tension member such as in a tie down assembly, the bore 20 need not be threaded but instead may be oversized for receiving an adjustment rod (not shown) which extends therethrough and has its protruding end threaded for threadably engaging a nut member between the leg portions of the yoke. The nut member may be of such size and shape to permit it to fit between the leg portions of the yoke while preventing relative rotation therebetween.

Referring now more particularly to FIGS. 2 through 4, it will be seen that the plastic body 12 has embedded therein a metal insert 24, preferably stamped from a thin strip of metal, such as spring steel formed to the desired shape as by bending and suitably annealed and heat treated. The metal insert 24 has longitudinally extending, spaced-apart legs 26 and a connecting web 28 therebetween at one end. The legs 26 extend substantially along the length of and are embedded substantially centrally in the leg portions 16 of the plastic body 12. The distal ends 34 of the legs 26 are semicircular with an outer radius less than that of the semicircular distal ends 36 of the leg portions 16 of the plastic body, and having an opening 30 therethrough which preferably is concentric with and has an inner diameter substantially equal to that of the corresponding clevis pin receiving bore 18.

The legs 26 are desirably tapered widthwise as best seen in FIG. 2 from the semicircular end toward the neck 38 thereof. As seen in FIG. 3, the neck 38 extends diagonally outwardly from opposite sides of the web 28 to the tapered portion of the legs 26 thus giving the collar portion 14 a slight tapered profile. The legs 26 further desirably include embossments 40 and 42 which extend outwardly and inwardly, respectively, from the sides thereof, with one or more holes 44 in the legs which become filled with plastic during the molding operation to provide a mechanical lock between the plastic body and the metal insert. The embossments 40, 42 also facilitate positioning and locating the metal inserts in the mold for subsequent forming of the plastic body therein as discussed in greater detail below.

The web 28 is similarly embedded in the collar portion 14 and has an opening 32 concentric with and slightly larger than the outer thread diameter of the central bore 20 thus to accommodate the same. As seen in FIG. 4, such web is desirably of hexagonal or other multisided shape, with the legs 26 extending substantially perpendicular from and connected at their proximal ends to one set of sides 46 thereof. The hexagonal shape of the web 28 prevents rotation of the same within the collar portion 14, and the vertices 48 of the web normal to the plane of the legs also facilitate positioning the insert within the mold as discussed in greater detail below.

The plastic body 12 is made of a high impact, high strength plastic such as nylon reinforced with fiberglass reinforcement and the like, and preferably formed by a conventional injection molding process. The parting line of the mold halves (not shown) may extend along a longitudinal plane bisecting both legs widthwise. Prior to injection of the plastic into the mold and mating of the mold halves, the metal insert 24 is placed therein. The position and location of the insert initially in one of the mold halves is precisely determined by the embossments 40, 42 which cooperate with corresponding detents provided in the mold cavity wall. The vertices 48 of the web 28 will also engage the sides of the mold cavity wall thereby centering the web within the mold cavity. When thus positioned in one of the mold halves, the mold halves may be mated and the plastic body injection molded embedding the insert therein. Because the embossments and vertices contact the walls of the mold cavity, they may be somewhat visible after the molding has been completed and the yoke removed from the mold as seen in FIG. 1 and designated generally at 50 and 52, respectively.

Referring now to FIGS. 5 through 7, there is shown a modified embodiment of yoke 10' in accordance with this invention wherein the same reference numerals followed by a prime symbol are used to designate like parts. The yoke 10' of the FIGS. 5 through 7 embodiment is substantially identical to the yoke previously described except for the addition of an axially extending metal insert fitting 54 in the collar portion 14' of the plastic body 12' which gives the yoke 10' added strength at the threaded bore thereof and also reduces the tendency of the plastic to creep when under tensile load.

The fitting 54, which is desirably made of a non-corrosive and easily machined metal such as brass or aluminum, has a threaded central bore 56 therethrough replacing the threaded central bore 20 in the plastic collar portion 14 of the FIGS. 1 through 4 embodiment, and also desirably includes mechanical locks to integrally relate the fitting within the yoke. The axial inner end of the fitting has an enlarged hexagonal portion 58 which prevents turning of the fitting within the plastic collar, and the axial outer end of the fitting includes a reduced diameter portion 60 forming a shoulder 62 with the enlarged hexagonal portion 58. The reduced diameter portion 60 is of a diameter somewhat less than that of the opening 32' in the web 28' to permit the reduced diameter portion 60 to project therethrough with the shoulder 62 abutting against the web 28'. The enlarged diameter portion 58 may also have an annular recess 64 therein which is filled with plastic material during the molding operation to provide a mechanical lock between the fitting and plastic collar resisting axial pullout when a tension load is applied. Similarly, the abutment of the shoulder 62 against the web 28' of the insert locks the same together when subjected to tensile loads thus preventing relative longitudinal movement therebetween.

A yoke made according to the present invention is unique in being approximately one-third the weight with approximately 60% of the strength of a standard forged yoke and is also much less expensive to manufacture. Moreover, it will be appreciated that because the yokes are molded from plastic, it is possible to repeat close tolerances part after part, which is not the case with conventional forged yokes where subsequent machining of the bores in the metal blanks necessarily results in parts of different dimensions being produced unless very precise machining is done at substantial increased cost.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed are defined as follows:

1. A reinforced plastic yoke comprising a plastic body having a collar portion at one end and a pair of spaced longitudinally extending portions integral with said collar portion, one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, mechanical lock means for interlocking said insert means within said plastic body, and at least one embossment in said legs thus to provide a mechanical lock between said insert means and said body.

2. A reinforced plastic yoke comprising a plastic body having a collar portion at one end and a pair of spaced longitudinally extending portions integral with said collar portion, one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, a longitudinally extending opening in said web, and insert fitting means embedded in said collar portion and extending through said opening in said web.

3. A yoke as set forth in claim 2 wherein said insert fitting means has an enlarged axial inner end portion and a reduced axial outer end portion defining an abutment shoulder therebetween, and said reduced axial outer end portion extends through said opening in said web with said abutment shoulder in abutting engagement with said web to provide a mechanical lock therebetween resisting axial pullout of said insert fitting means relative to said metal insert means.

4. A yoke as set forth in claim 3 wherein said insert fitting means includes mechanical lock means for preventing relative longitudinal and rotational movement of said insert fitting means with respect to said collar portion of said body.

5. A yoke as set forth in claim 4 wherein said mechanical lock means includes a noncircular portion on said enlarged axial inner end portion of said insert fitting means preventing relative rotation between said insert fitting means and collar portion of said body.

6. A yoke as set forth in claim 5 wherein said mechanical lock means includes an annular recess in said enlarged portion into which the plastic of said collar portion of said body extends to resist relative longitudinal movement between said insert fitting means and collar portion of said body.

7. A reinforced plastic yoke comprising a plastic body having a collar portion at one end and a pair of spaced longitudinally extending portions integral with said collar portion, one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, and mechanical lock means for interlocking said insert means within said plastic body, said web being noncircular in shape thus mechanically to prevent rotation of the same relative to said collar portion of said body, said legs extending substantially perpendicular from opposite sides of said web, said body being formed by molding the same in a mold, and portions of said web normal to said opposite sides of said web being adapted to contact the walls of the mold cavity to position the web therein when the insert means is placed in the mold cavity prior to molding said plastic body.

8. A reinforced plastic yoke comprising a plastic body having a collar portion at one end and a pair of spaced longitudinally extending portions integral with said collar portion, and one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, said body being formed by molding the same in a mold, said insert means including spacer means to facilitate positioning of said insert means in the mold prior to molding said body, said spacer means including a plurality of embossments in said legs adapted to contact the walls of the mold cavity to position the legs therein when the insert means is placed in the mold cavity, and said embossments also providing a mechanical lock between said insert means and said body.

9. A reinforced plastic yoke comprising a plastic body having a collar portion at one end and a pair of spaced longitudinally extending portions integral with said collar portions, and one piece metal insert means embedded in said collar portion and longitudinally extending portions for reinforcing the same, said insert means including an internally threaded, longitudinally extending insert fitting in said collar portion of said body, and said insert fitting including mechanical lock means for preventing relative longitudinal and rotational movement between said insert means and collar portion of said body.

10. A yoke as set forth in claim 9 wherein said insert fitting is made of a non-corrosive, easily machined metal.

11. A reinforced plastic yoke comprising a plastic body having a collar portion at one end and a pair of spaced longitudinally extending portions integral with said collar portion, and one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, said legs including at least one opening through which extends a portion of said plastic body thus to provide a mechanical lock between said insert means and said body against pull out.

12. A yoke as set forth in claim 11 wherein said web is noncircular in shape thus mechanically to prevent rotation of the same relative to said collar portion of said body.

13. A yoke as set forth in claim 12 wherein said web is of hexagonal shape and said legs extend substantially perpendicular from opposite sides of said web.

14. A reinforced plastic yoke comprising a plastic body having a collar portion at one end and a pair of spaced longitudinally extending portions integral with said collar portion, and one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, said longitudinally extending portions at the distal ends thereof having transversely aligned pin receiving bores therein, and said legs at the distal ends thereof having bores concentric with said pin receiving bores.

15. A yoke as set forth in claim 14 wherein each said bore in each said leg has a diameter substantially equal to that of the corresponding pin receiving bores in said longitudinally extending portions.

16. A yoke as set forth in claim 15 wherein said distal ends of said legs are of a lesser dimension than the respective distal ends of said longitudinally extending portions whereby the outer periphery of said distal ends of said legs is substantially enclosed by said distal ends of said longitudinally extending portions.

17. A yoke as set forth in claim 14 wherein said body is formed by molding the same in a mold, and said insert means includes spacer means to facilitate positioning of said insert means in the mold prior to molding said body.

18. A reinforced plastic yoke comprising a plastic body having a collar portion at one end and a pair of spaced longitudinally extending portions integral with said collar portion, and one piece metal insert means embedded in said collar portion and longitudinally extending portions for reinforcing the same, said insert means having two spaced, longitudinally extending legs embedded respectively in said longitudinally extending portions of said body and a web connecting said legs embedded in said collar portion of said body, said collar portion having a longitudinally extending bore, and said web of said insert means having a longitudinally extending opening concentric with said longitudinally extending bore.

19. A yoke as set forth in claim 18 wherein said longitudinally extending bore in said collar portion is threaded.

20. A reinforced plastic yoke for coupling opposed load members for transmission of axial tensile loads, said yoke comprising a plastic body having a collar portion at one end and a pair of spaced longitudinally extending portions integral with said collar portion, said collar portion having means for connecting same to one load member and said longitudinally extending portions having means for connecting same to the other load member, and one piece insert means embedded in said collar portion and longitudinally extending portions for reinforcing same, said insert means extending between said means for connecting to increase the strength of said plastic body along the effective load bearing length thereof.

21. A yoke as set forth in claim 20 wherein said insert means is made of spring steel.

22. A yoke as set forth in claim 20 wherein said plastic body is made of fiberglass reinforced nylon.

23. A yoke as set forth in claim 20 wherein said means for connecting said collar portion includes a threaded longitudinal bore in said collar portion, and said means for connecting said longitudinally extending portions includes transversely aligned pin receiving bores in the distal ends of said pin receiving bores.

* * * * *